United States Patent
Zhou et al.

(10) Patent No.: US 11,431,831 B2
(45) Date of Patent: Aug. 30, 2022

(54) ELECTRONIC DEVICE AND METHOD OF CONTROLLING SCREEN OF ELECTRONIC DEVICE, AND STORAGE MEDIUM

(71) Applicant: WUHAN CHINA STAR OPTOELECTRONICS SEMICONDUCTOR DISPLAY TECHNOLOGY CO., LTD., Wuhan (CN)

(72) Inventors: Yang Zhou, Wuhan (CN); Mugyeom Kim, Wuhan (CN); Yong Zhao, Wuhan (CN); Hong Gao, Wuhan (CN)

(*) Notice: Subject to any disclaimer, the term of this patent is extended or adjusted under 35 U.S.C. 154(b) by 277 days.

(21) Appl. No.: 16/612,382

(22) PCT Filed: Apr. 16, 2019

(86) PCT No.: PCT/CN2019/082875
§ 371 (c)(1),
(2) Date: Nov. 10, 2019

(87) PCT Pub. No.: WO2020/133810
PCT Pub. Date: Jul. 2, 2020

(65) Prior Publication Data
US 2021/0337053 A1 Oct. 28, 2021

(30) Foreign Application Priority Data
Dec. 28, 2018 (CN) .......................... 201811629611.7

(51) Int. Cl.
*G09G 3/36* (2006.01)
*H04M 1/02* (2006.01)
(Continued)

(52) U.S. Cl.
CPC ..... *H04M 1/0266* (2013.01); *H04M 1/72454* (2021.01); *G06F 21/32* (2013.01)

(58) Field of Classification Search
CPC .. H04M 1/0266; H04M 1/72454; G09G 3/36; G09G 5/00; G06F 3/038
See application file for complete search history.

(56) References Cited

U.S. PATENT DOCUMENTS

2014/0240379 A1* 8/2014 Jeong ................... G09G 3/3266
345/691
2016/0049129 A1* 2/2016 Hekstra ............... G06F 3/04164
345/174
(Continued)

FOREIGN PATENT DOCUMENTS

| CN | 106716431 A | 5/2017 |
| CN | 107580092 A | 1/2018 |

(Continued)

*Primary Examiner* — Pegeman Karimi

(57) ABSTRACT

An electronic device and a method of controlling a screen of the electronic device, and a storage medium. The electronic device includes a screen including at least one multiplexing function region; a function module disposed below the screen, a location of the function module corresponds to a location of the at least one multiplexing function region; controlling the at least one multiplexing function region to be in a first state when receiving a startup instruction of the function module, so that the function module transmits a signal through the at least one multiplexing function region.

17 Claims, 4 Drawing Sheets

(51) Int. Cl.
*H04M 1/72454* (2021.01)
*G06F 21/32* (2013.01)

(56) References Cited

U.S. PATENT DOCUMENTS

| | | | |
|---|---|---|---|
| 2017/0024091 A1 | 1/2017 | Hosier, Jr. | |
| 2017/0220153 A1* | 8/2017 | Koide | G06F 3/0412 |
| 2019/0019048 A1 | 1/2019 | Deng et al. | |
| 2020/0118518 A1* | 4/2020 | Chu | G09G 5/008 |
| 2020/0251034 A1* | 8/2020 | Zheng | G09G 3/20 |
| 2021/0097913 A1* | 4/2021 | Xing | G09G 3/20 |

FOREIGN PATENT DOCUMENTS

| | | |
|---|---|---|
| CN | 108600468 A | 9/2018 |
| CN | 108960215 A | 12/2018 |

* cited by examiner

ELECTRONIC DEVICE AND METHOD OF CONTROLLING SCREEN OF ELECTRONIC DEVICE, AND STORAGE MEDIUM

FIELD OF INVENTION

The present disclosure relates to the field of display technology, in particular, to an electronic device and a method of controlling a screen of an electronic device, and a storage medium.

BACKGROUND OF INVENTION

With advancement of electronic devices, user requirements for electronic devices are constantly changing, especially the requirements of screens have become increasingly demanding.

In order to make corresponding functions of the electronic device work normally, the screen of existing electronic device is usually provided with a function hole. For example, a front camera hole, a sensor hole, a fingerprint recognition module, an earpiece hole, and the like need to be set on the screen, thereby causing an area of a non-display area larger, an area of a display area and a screen ratio are reduced.

Therefore, it is necessary to provide an electronic device and a method of controlling a screen of the electronic device, and a storage medium, to solve the issues of the prior art.

SUMMARY OF INVENTION

The present disclosure provides an electronic device and a method of controlling a screen of an electronic device, and a storage medium. Which can increase the screen ratio of the screen.

In order to solve the above issues, the present disclosure provides a method of controlling a screen of an electronic device, wherein the electronic device includes:
a screen including at least one multiplexing function region;
a function module, disposed below the screen, wherein a location of the function module corresponds to a location of the at least one multiplexing function region;
the method including:
controlling the at least one multiplexing function region to be in a first state when the electronic device receives a startup instruction of the function module, so that the function module transmits a signal through the at least one multiplexing function region.

The present disclosure further provides an electronic device, which includes a controller and a storage device, the storage device used for storing instructions, the controller used for executing the instructions to implement a method of controlling a screen of an electronic device above.

The present disclosure further provides a storage medium in which at least one instruction is stored in the storage medium, the instruction being loaded by a processor and executed to implement a method of controlling a screen of an electronic device above.

The electronic device and the method of controlling a screen of an electronic device, and the storage medium of the present disclosure, wherein the electronic device includes a screen including at least one multiplexing function region, a function module disposed below the screen, wherein the position of the function module corresponds to a location of the at least one multiplexing function region. Controlling the at least one multiplexing function region to be in a first state when the electronic device receives a startup instruction of the function module. So that the function module transmits a signal through the at least one multiplexing function region. Since a part of the screen is used as a signal transmission area of the function module, thereby avoiding setting a function hole on the screen, the area of the non-display area is reduced, the screen ratio of the screen is increased.

DETAILED DESCRIPTION OF PREFERRED EMBODIMENTS

Figure 1:
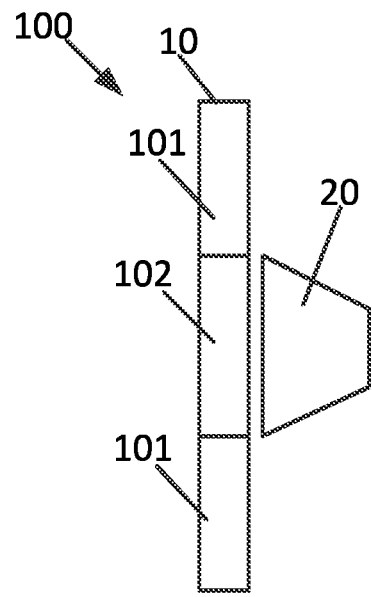
FIG. 1 is a first side view of an electronic device of the present disclosure.

The following description of the various embodiments is provided to illustrate the specific embodiments. Directional terms described by the present disclosure, such as top, bottom, front, back, left, right, inner, outer, side, etc., are only directions by referring to the accompanying drawings, and thus the used terms are used only for the purpose of describing embodiments of the present disclosure and are not intended to be limiting of the present disclosure. In the drawings, units with similar structures are labeled with the same reference number.

Please referring to FIG. 1 to FIG. 7, FIG. 1 is a side view of an electronic device of the present disclosure.

As shown in FIG. 1, the electronic device 100 of the present disclosure includes a screen 10 and a function module 20.

Figure 2:
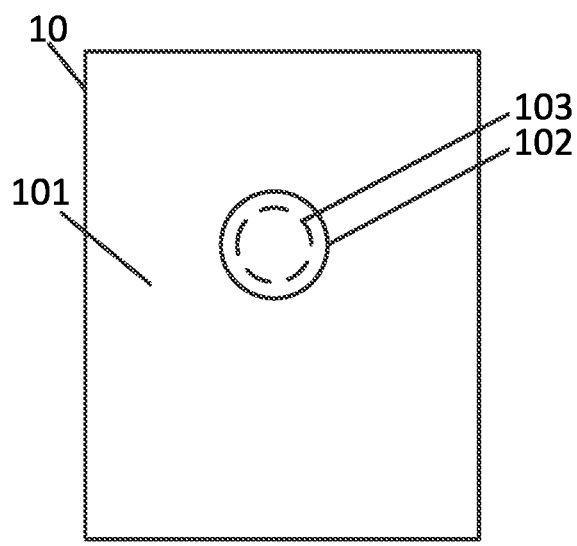
FIG. 2 is a plan view of the electronic device of FIG. 1.

In conjunction with FIG. 2, the screen 10 includes a single function region 101 and a multiplexing function region 102, the single function region 101 is an area other than the multiplexing function region 102. The single function region 101 is used for display, and the single function region 101 is also an existing display area. The multiplexing function region 102, a region where a solid line circle located in the FIG. 2, is used for displaying and transmitting a signal of a function module. In order to improve the display effect, at least one multiplexing function region 102 is located at an edge of the screen 10, such as at an upper edge or a lower edge of the screen 10.

When the function module 20 is turned on, the multiplexing function region 102 is in a first state, so that the function module 20 transmits a signal through the multiplexing function region 102. For example, the function module 20 receives a signal or sends a signal through the multiplexing function region 102, at this time, a state of multiplexing function region 102 is different from a state of the single function region 101. For example, when the single function region 101 is in a display state, the multiplexing function region 102 is in a non-display state or a non-light emitting state. When the function module 20 is not turned on, the multiplexing function region 102 is in a second state, at this time, a state of the multiplexing function region 102 is the same as a state of the single function region 101. For example, when the single function region 101 in a display state, the multiplexing function region 102 is also in a display state. When the single function region 101 is in a non-display state, the multiplexing function region 102 is also in a non-display state.

The function module 20 is disposed below the screen 10, such as on a circuit board of an electronic device. A location of the function module 20 corresponds to a location of the at least one multiplexing function region 102. That is, the function module 20 is disposed directly below the multiplexing function region 102.

Wherein an area of the at least one multiplexing function region 102 is greater than or equal to an area of an orthographic projection 103, a position where the dashed circle, of the function module 20 on the screen 10, to improve the accuracy of the control function.

Figure 3:
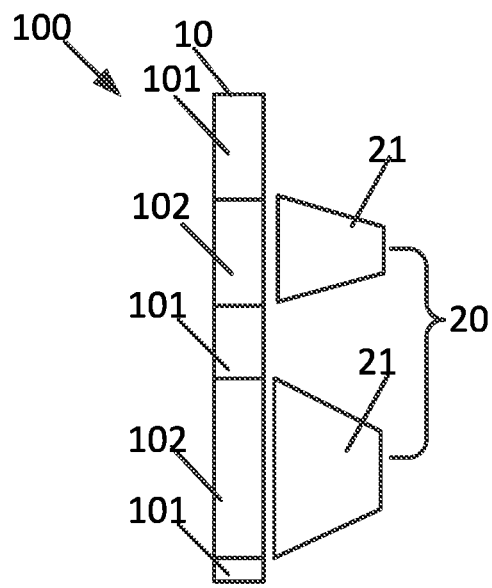
FIG. 3 is a second side view of an electronic device of the present disclosure.
Figure 4:
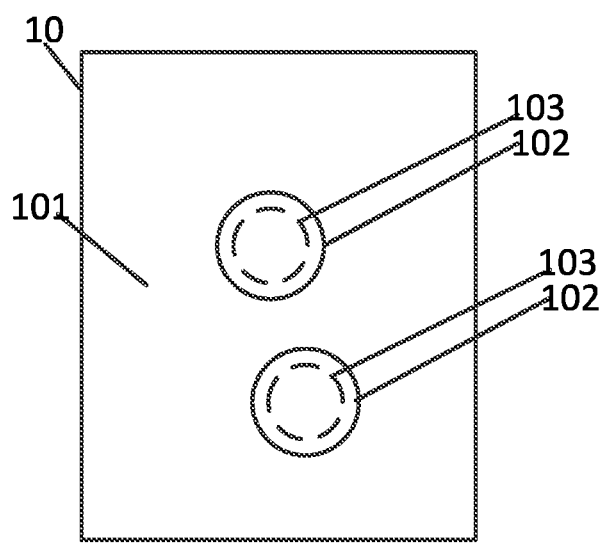
FIG. 4 is a plan view of the electronic device of FIG. 3.

To further increase the proportion of the screen, as shown in FIG. 3 and FIG. 4, wherein the function module 20 includes at least two sub-function modules 21, the at least one sub-function module 21 includes one of a camera assembly, a sensor assembly, a fingerprint recognition module, a speaker, and a receiver. The camera assembly is, such as a front camera assembly, which includes a lens and a drive module. The at least one multiplexing function region 102 corresponds to the at least one sub-function module 21.

In order to improve the accuracy of the control function, in one embodiment, the multiplexing function region 102 and sub-function module 21 have a plurality of multiplexing function regions 102 and sub-function modules 21, and the multiplexing function regions 102 are in one-to-one correspondence with the sub-function module 21. That is, each of the multiplexing function regions 102 corresponds to a sub-function module 21. It can be understood that the function module 20 can also include one or two or more sub-function modules.

Figure 5:
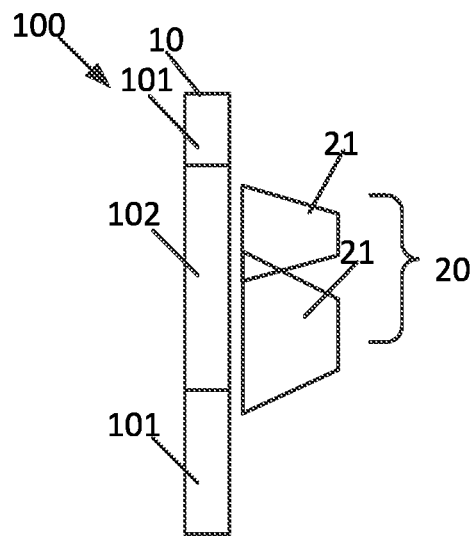
FIG. 5 is a second side view of an electronic device of the present disclosure.
Figure 6:
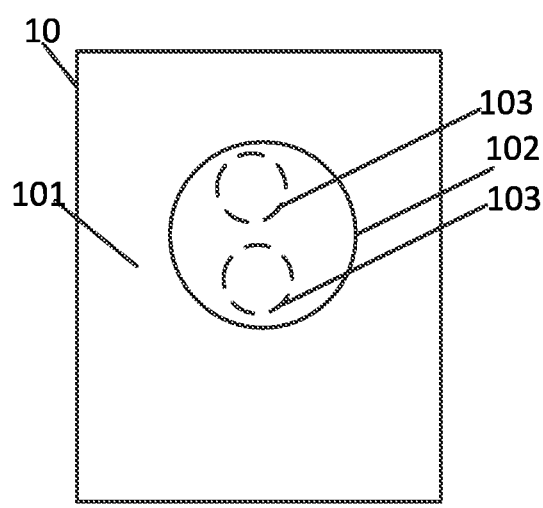
FIG. 6 is a top plan view of the electronic device of FIG. 5.

Of course, in another embodiment, as shown in FIG. 5 and FIG. 6, the two sub-function modules 21 may also all correspond to the at least one multiplexing function region 102, wherein, an area of an orthographic projection 103 of two sub-function modules 21 on the screen 10 is smaller than the sum of an area of the multiplexing function region 102. Of course, the function module 20 may also include one or at least two sub-function modules 21. When the function module 20 includes more than two sub-function modules 21, the sum of areas of orthographic projections of the plurality of sub-function modules 21 on the screen 10 is smaller than the area of the at least one multiplexing function region 102.

Figure 7:
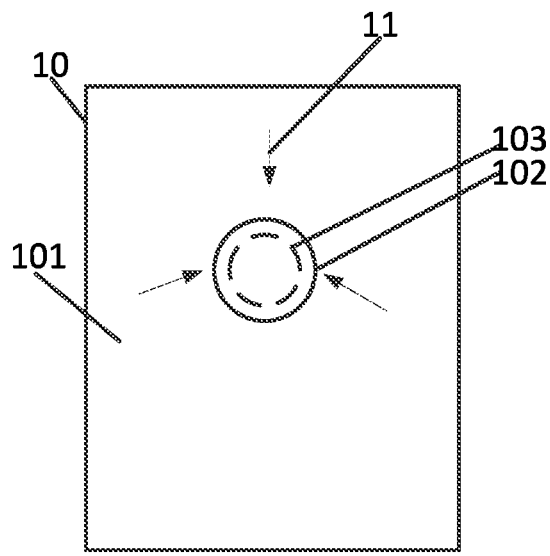
FIG. 7 is a third top view of an electronic device of the present disclosure.

Please refer to FIG. 1, FIG. 2, and FIG. 7, when the function module 20 is turned on, a peripheral region of the multiplexing function region 102 is displayed with a prompt signal 11. That is, the single function area 101 around the peripheral region of the multiplexing function region 102 is displayed with the prompt signal 11. The prompt signal, such as a blinking signal, a circle of indications, an arrow, etc., such as flashed a red dot, a red circle or an arrow around the periphery of the multiplexing function area 102 to prompt the user to input a corresponding signal. Take the fingerprint recognition function on the mobile phone as an example. For example, when the mobile phone is in a lock screen state, the user picks up the mobile phone, and the screen is lit, while a red circle is displayed on the periphery of the multiplexing function region 102 to prompt the user to input a fingerprint to unlock the screen. Or for example, when the phone is in a lock screen state, the user presses the screen, and the screen is lit at this time, and a red circle is displayed on the periphery of the multiplexing function region 102 to prompt the user to input a fingerprint to unlock the screen.

The present disclosure also provides a method of controlling a screen of the above electronic device, comprising:

S101, controlling the at least one multiplexing function region to be in a first state when the electronic device receives a startup instruction of the function module, so that the function module transmits a signal through the at least one multiplexing function region.

Please refer to FIG. 1 to FIG. 7, for example, detecting whether the predetermined function module is turned on, a startup instruction is used for turning on the function module. For example, when the user opens the camera software and selects a self-timer function, a camera component received the startup instruction; when the user picks up the mobile phone in the lock screen state or other payment software displays the fingerprint input box, the fingerprint recognition module received the startup instruction; when the user presses an answer key on a call interface, a sensor component receives the startup instruction; When the user presses a play button of a play software or an answer button on the call interface, the receiver received the startup instruction. Of course, the startup instruction is not limited to the above example, and may be other situations, and details are not described herein again.

For example, controlling at least one multiplexing function region 102 to be in a first state when the electronic device receives a startup instruction of a function module.

When detected the camera component is turned on, the user turns on the camera software to select the self-timer function, controlling the corresponding multiplexing function region 102 to be in a non-lighting state, so that the lens captures an image of a face through the multiplexing function region 102.

When detected the fingerprint recognition module is turned on, controlling the corresponding multiplexing function region 102 to be in a non-lighting state. At this time, the fingerprint recognition module acquires the fingerprint information input on the corresponding multiplexing function region 102.

When detected the user selecting the answer key, the sensor assembly is turned on, controlling the corresponding multiplexing function region 102 to be in a non-lighting state. At this time, the light emitter in the sensor assembly emits an optical signal through the multiplexing function region 102, the light receiver in the sensor assembly receives the light signal by the multiplexing function region 102.

When detected the speaker is turned on, controlling the corresponding multiplexing function region 102 in a non-lighting state, the speaker receives the sound wave signal through the multiplexing function region 102 and processes it accordingly.

When detected the handset is turned on, controlling the corresponding multiplexing function region 102 in a non-lighting state, the handset receives the sound wave signal through the multiplexing function region 102 and processes it accordingly.

The method can also include:

S102, when the startup instruction of the function module is not received, the at least one multiplexing function region is controlled to be in the second state.

For example, when the startup instruction of the function module is not received, at least one the multiplexing function region 102 is controlled to be in the second state. For example, in a selfie function, when the user does not open the camera software, controlling the corresponding multiplexing function region 102 to maintain in an original state, such as a display state or a lock screen state, at this time, the multiplexing function 102 be used as a display area normally.

When the startup instruction of the function module is received, the method further includes:

S103, controlling a peripheral region of the at least one multiplexing function region to display a prompt signal.

As shown in FIG. 7, when the function module 20 is turned on, controlling the peripheral region of the at least one multiplexing function region 102 to display the prompt signal 11. The prompting signals are, for example, a blinking signal, a pointing circle, an arrow, and the like, such as flashing a red dot, a red circle or an arrow or the like on the periphery of the multiplexing function region 102 to prompt the user to input a corresponding signal.

For example, in fingerprint recognition on the phone, when the phone is in the lock screen state, the user picks up the phone, the screen is lit, while a red circle is displayed on the periphery of the multiplexing function region 102 to prompt the user to input a fingerprint to unlock the screen. Or such as when the phone is in a lock screen state, the user presses the screen, and the screen is lit at this time, while a red circle is displayed on the periphery of the multiplexing function region 102 to prompt the user to input a fingerprint to unlock the screen.

Figure 8:
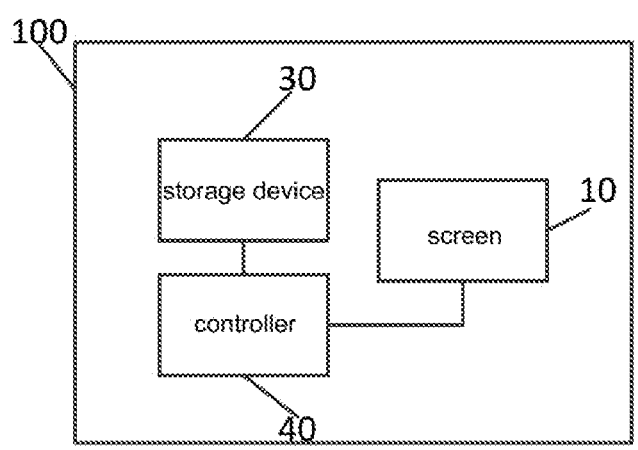
FIG. 8 is a schematic structural view of an electronic device according to the present disclosure.

The present disclosure further provides an electronic device, as shown in FIG. 8, which includes a storage device 30 and a controller 40, the storage device 30 used for storing instructions, the controller 40 used for executing the instructions to implement any one of above method of controlling the screen of an electronic device. In conjunction with FIG. 1 to FIG. 7, the electronic device may further include a screen 10 and a function module 20.

The present disclosure also provides a storage medium, wherein the storage medium stores at least one instruction loaded by a processor and executed to implement a control method of a screen of an electronic device described above.

An electronic device and the method of controlling a screen of the electronic device, and a storage medium of the present disclosure, wherein the electronic device includes a screen including at least one multiplexing function region, a function module disposed below the screen, wherein the position of the function module corresponds to a location of the at least one multiplexing function region. Controlling the at least one multiplexing function region to be in a first state when the electronic device receiving a startup instruction of the function module. So that the function module transmits a signal through the at least one multiplexing function region. Since a part of the screen is used as a signal transmission area of the function module, thereby avoiding setting a function hole on the screen, the area of the non-display area is reduced, the screen ratio of the screen is increased.

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

What is claimed is:

1. A method of controlling a screen of an electronic device, wherein the electronic device comprises the screen comprising at least one multiplexing function region and at least one single function region; and a function module, disposed below the screen, wherein a location of the function module is opposite to a location of the at least one multiplexing function region, and wherein the function module is covered by the at least one multiplexing function region;

the method comprising:

controlling the at least one multiplexing function region to be in a non-lighting state when the electronic device receives a startup instruction, so that the function module receives a light signal through the at least one multiplexing function region; and controlling the at least one single function region and the at least one multiplexing function region to be in a display state when the function module is turned off;

wherein the startup instruction is used for turning on the function module.

2. The method of controlling the screen of the electronic device as claimed in claim 1, wherein when the startup instruction of the function module is received, the method further comprises:

controlling a peripheral region of the at least one multiplexing function region to display a prompt signal.

3. The method of controlling the screen of the electronic device as claimed in claim 1, wherein an area of the at least one multiplexing function region is greater than or equal to an area of an orthographic projection of the function module on the screen.

4. The method of controlling the screen of the electronic device as claimed in claim 1, wherein the function module comprises at least one sub-function module, and the at least one multiplexing function region corresponds to the at least one sub-function module.

5. The method of controlling the screen of the electronic device as claimed in claim 4, wherein the at least one multiplexing function region and sub-function module have a plurality of multiplexing function regions and sub-function modules, and the multiplexing function regions are in one-to-one correspondence with the sub-function modules.

6. The method of controlling the screen of the electronic device as claimed in claim 4, wherein the function module comprises at least two sub-function modules, and the sub-function modules all correspond to the at least one multiplexing function region.

7. The method of controlling the screen of the electronic device as claimed in claim 4, wherein the at least one sub-function module comprises one of a camera assembly, a sensor assembly, a fingerprint recognition module, a speaker, and a receiver.

8. The method of controlling the screen of the electronic device as claimed in claim 1, wherein the at least one multiplexing function region is located at an edge of the screen.

9. An electronic device, comprising a controller and a storage device, the storage device used for storing instructions, the controller used for executing the instructions to implement a method of controlling a screen of the electronic device:

controlling at least one multiplexing function region to be in a non-lighting state when the electronic device receives a startup instruction of a function module, so that the function module receives a light signal through the at least one multiplexing function region; and controlling at least one single function region and the at least one multiplexing function region to be in a display state when the function module is turned off;

wherein the startup instruction is used for turning on the function module;

the electronic device further comprising:
the screen comprising the at least one multiplexing function region and the at least one single function region;
the function module, disposed below the screen, wherein a location of the function module is opposite to a location of the at least one multiplexing function region, and wherein the function module is covered by the at least one multiplexing function region.

10. The electronic device as claimed in claim 9, wherein when the startup instruction of the function module is received, the method further comprises:
controlling a peripheral region of the at least one multiplexing function region to display a prompt signal.

11. The electronic device as claimed in claim 9, wherein an area of the at least one multiplexing function region is greater than or equal to an area of an orthographic projection of the function module on the screen.

12. The electronic device as claimed in claim 9, wherein the function module comprises at least one sub-function module, and the at least one multiplexing function region corresponds to the at least one sub-function module.

13. The electronic device as claimed in claim 12, wherein the at least one multiplexing function region and sub-function module have a plurality of multiplexing function regions and sub-function modules, and the multiplexing function regions are in one-to-one correspondence with the sub-function modules.

14. The electronic device as claimed in claim 12, wherein the function module comprises at least two sub-function modules, and the sub-function modules all correspond to the at least one multiplexing function region.

15. The electronic device as claimed in claim 12, wherein the at least one sub-function module comprises one of a camera assembly, a sensor assembly, a fingerprint recognition module, a speaker, and a receiver.

16. The electronic device of claim 9 wherein the at least one multiplexing function region is located at an edge of the screen.

17. A storage medium, wherein the storage medium stores at least one instruction loaded by a processor and executed to implement a control method of a screen of an electronic device:
controlling at least one multiplexing function region to be in a non-lighting state when the electronic device receives a startup instruction, so that a function module receives a light signal through the at least one multiplexing function region; and
controlling at least one single function region and the at least one multiplexing function region to be in a display state when the function module is turned off;
wherein the startup instruction is used for turning on the function module;
the electronic device further comprising:
the screen comprising the at least one multiplexing function region and the at least one single function region;
the function module, disposed below the screen, wherein a location of the function module is opposite to a location of the multiplexing function region, and wherein the function module is covered by the at least one multiplexing function region.

* * * * *